(12) United States Patent
Yamamoto

(10) Patent No.: US 6,253,283 B1
(45) Date of Patent: Jun. 26, 2001

(54) STORAGE CONTROL APPARATUS

(75) Inventor: Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/348,261

(22) Filed: Jul. 7, 1999

(30) Foreign Application Priority Data

Jul. 8, 1998 (JP) ................................................. 10-192663

(51) Int. Cl.$^7$ .................................................. G06F 12/04
(52) U.S. Cl. ........................................... 711/114; 711/212
(58) Field of Search ........................... 711/111–112, 114, 711/202, 4, 154, 212; 360/48; 709/217, 219, 236, 250; 710/72–74, 129, 66, 127

(56) References Cited

U.S. PATENT DOCUMENTS

| 5,388,013 | * | 2/1995 | Nakamura | ................................ | 360/48 |
| 5,983,317 | * | 11/1999 | Kanda et al. | ........................ | 711/112 |
| 6,009,498 | * | 12/1999 | Kumasawa et al. | ................. | 711/113 |
| 6,098,129 | * | 8/2000 | Fukuzawa et al. | .................... | 710/65 |

FOREIGN PATENT DOCUMENTS

| 4-245352 | 9/1992 | (JP) . |
| 9-258908 | 10/1997 | (JP) . |

OTHER PUBLICATIONS

S/390 Multiprise 2000, Nikkei Computer, pp. 53–54. No Translation.

RAMAC3, RVA2, RSA2, 3590, 3494VTS, Nikkei Computer, pp. 124–133. No Translation.

H–6592/H–6595–9, H–6592–S, H–6592–L, Nikkei Computer, pp. 144–153. No Translation.

ACM SIGMOD Conference Proceeding, Chicago, IL, Jun. 3, 1988, A Case for Redundant Arrays of Inexpensive Disks (RAID), D. Patterson et al, pp. 109–116.

Computer Architecture, D. Patterson et al, pp. 546–553.

* cited by examiner

Primary Examiner—B. James Peikari
Assistant Examiner—Denise Tran
(74) Attorney, Agent, or Firm—Mattingly, Stanger & Malur, P.C.

(57) ABSTRACT

A processor of a mainframe host is provided with a variable length/fixed length format conversion function, and furthermore, provided with a function capable of connecting with a disk array provided outside a frame of the mainframe host by a fixed length interface. As a result, data to which the mainframe host, a UNIX server, and a PC server separately access can be commonly stored into the disk array equipped with the fixed length format interface. An interface for connecting a mainframe unit to an open system, is made identical to another interface for connecting a disk array which commonly stores thereinto data accessed by, for example, a UNIX server and a PC server, to both the mainframe host and the open system. As a result, a management step number of the computer system can be reduced, and the computer system can be easily utilized.

2 Claims, 15 Drawing Sheets

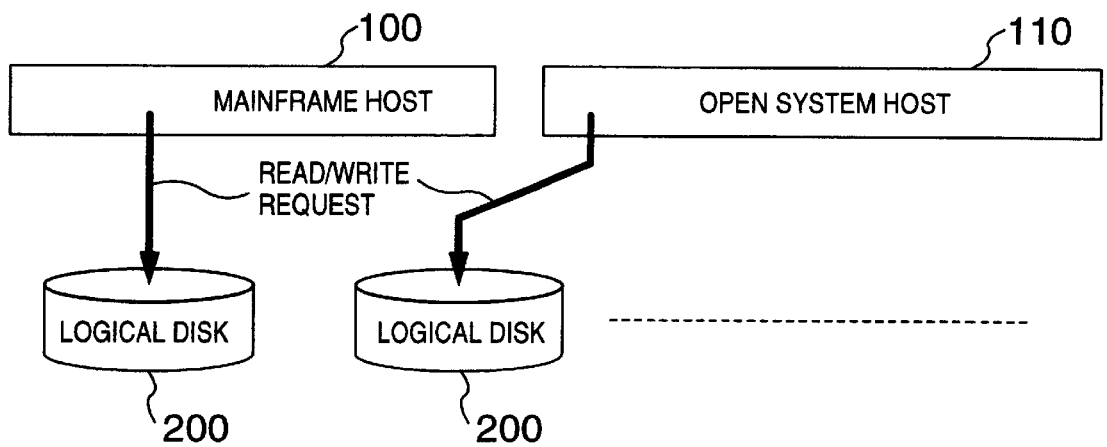
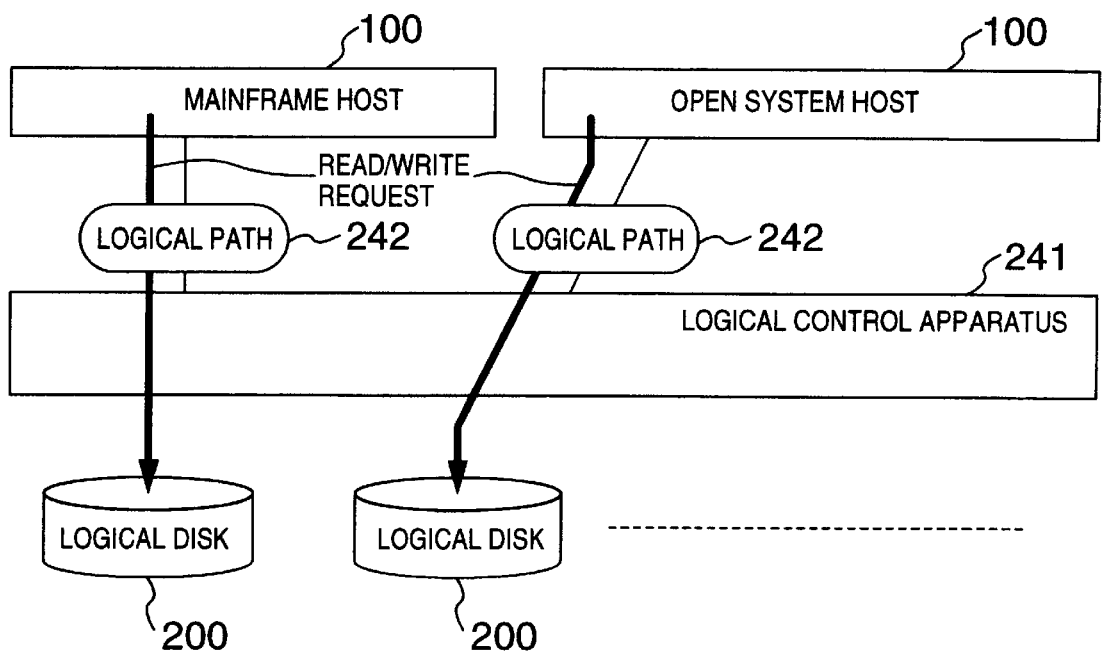
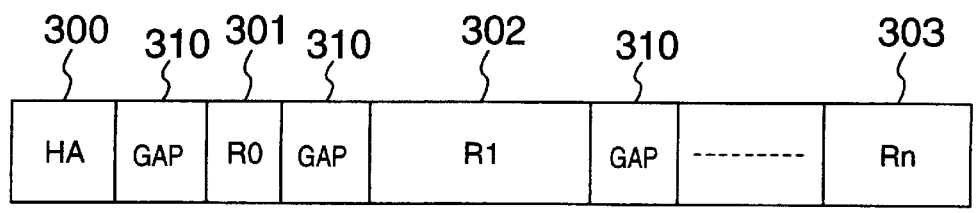

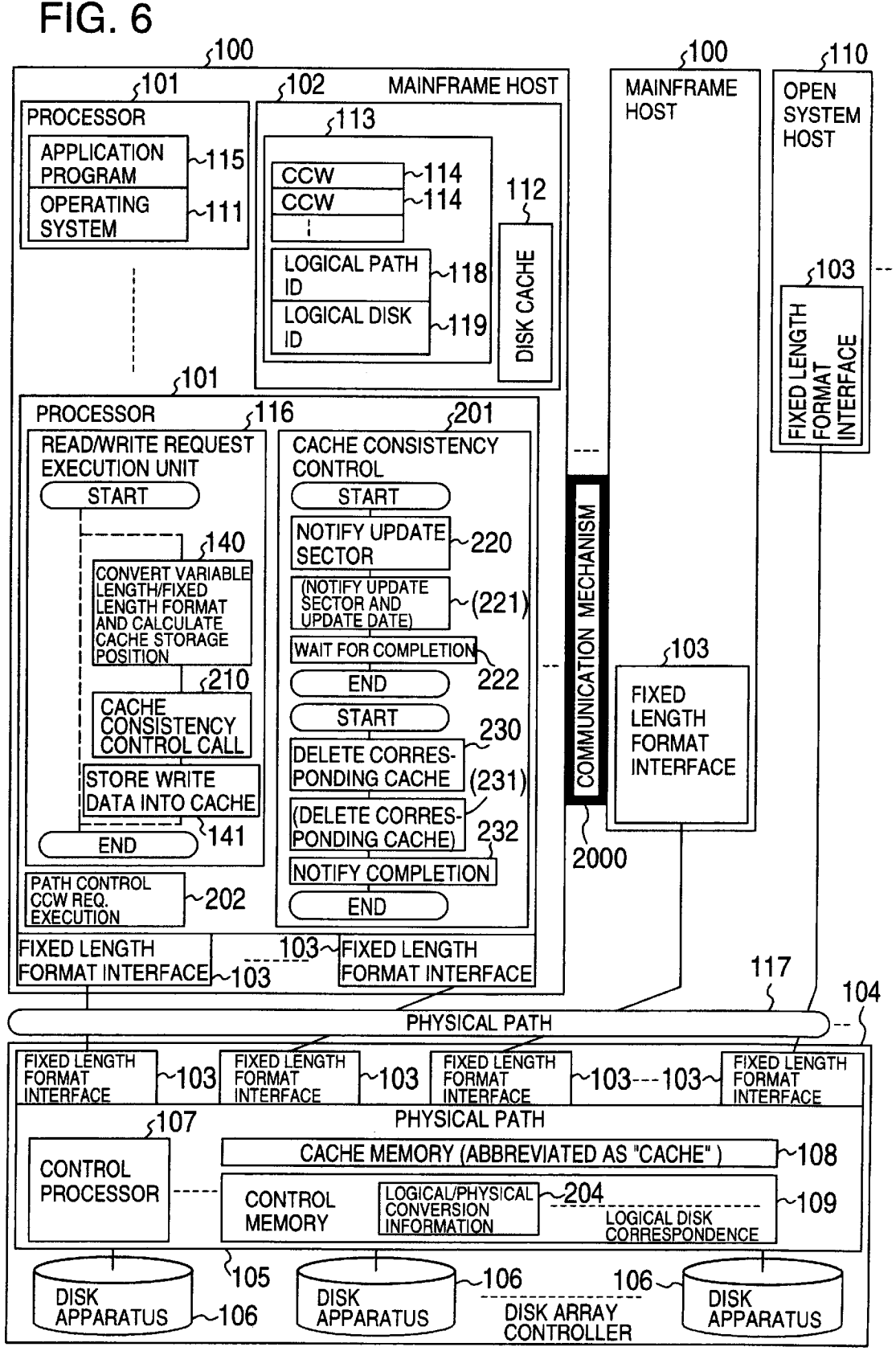

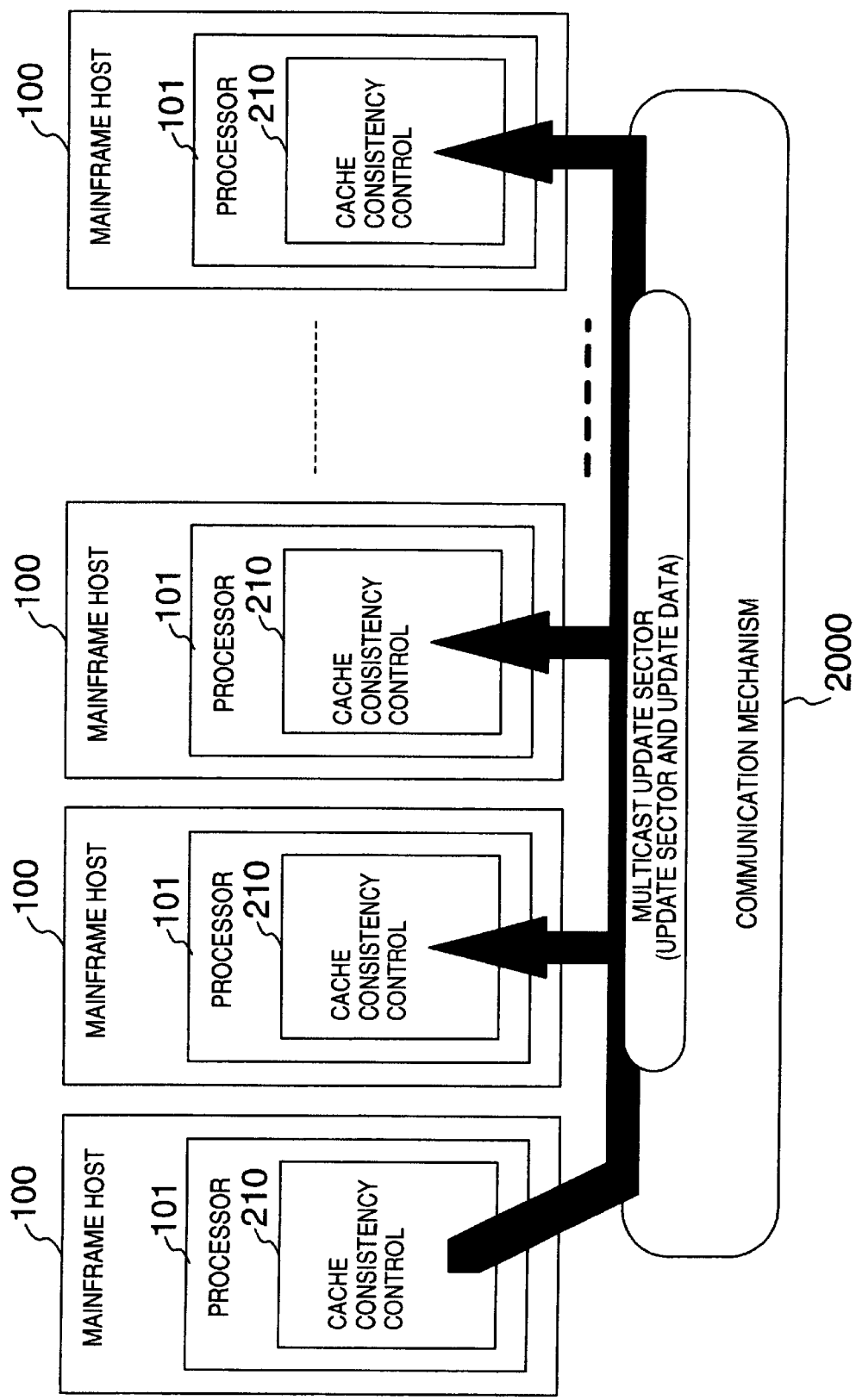

STORAGE CONTROL APPARATUS

BACKGROUND OF THE INVENTION

The present invention relates to a data access method in a composite computer system arranged by a mainframe, a UNIX server, a PC server, and a storage system connected to these apparatuses.

As the prior art related with the present invention, the below-mentioned techniques are disclosed:

In mainframes, the variable length format has been employed as the data recording format.

On the other hand, in open systems such as a UNIX server and a PC server other than mainframes, the fixed length format has been employed as the data recording format.

Very recently, high density and high performance of fixed length format disk apparatuses are rapidly realized.

On the other hand, "A Case for Redundant Arrays of Inexpensive Disks (RAID)" written by D. Patterson, et. al, is known from ACM SIGMOD conference proceedings, Chicago, Ill., Jun. 1 to 3, 1998, pages 109 to 116.

This Patterson's thesis describes the technique for the data location on the disk array.

A disk array is a mechanism capable of realizing high performance and high reliability of a disk system. To achieve high performance in a disk array, a plurality of physically-realized disk apparatuses have the appearance of a single disk apparatus with respect to a processing apparatus. On the other hand, in order to realize high reliability of such a disk array, when a failure happens to occur in one disk apparatus for storing data, redundant data used to recover data is stored into another disk apparatus.

Considering the above-explained concept, generally speaking, disk arrays are popularized in computer systems. Usually, disk arrays are constituted by plural disk apparatuses and a disk array controller for controlling the respective disk apparatuses.

Since the fixed length format is utilized in a UNIX server and a PC server, an interface provided between a server and a disk array controller employs a fixed length format type interface. Also, since each of disk apparatuses provided inside a disk array owns the fixed length format, an interface provided between a disk array controller and a disk apparatus employs a fixed length format type interface.

Generally speaking, in the case of a disk array used in a mainframe, while a fixed length format disk apparatus is gradually realized with having high density and a high performance, fixed length format disk apparatuses are normally employed in each of these disk apparatuses. Then, a disk array controller utilizes a cache memory and owns a fixed length/variable length conversion function, whereas both a mainframe host and a disk array controller are connected to each other by way of a variable length format type interface. As to the variable length format type interface, the input/output request issued from the mainframe is constituted by a plurality of input/output commands referred to as CCW (Channel Command Word), as described in the publication "Computer Architecture" written by Jhon Hennecy, and David Patterson, pages 546 to 553. A plurality of CCWs are referred to as a CCW chain. These CCW chains are formed by an operating system of a mainframe in response to a request from an application program.

Very recently, computer systems are normally arranged by mixture systems of mainframes, UNIX servers, and PC servers. In such a computer system arrangement, a strong demand is made as follows. That is, in order to easily manage the disk array, data to which the mainframe, the UNIX server, and the PC server separately access are commonly stored, so that the disk array is managed in a batch mode. To satisfy such a demand, a disk array equipped with both types of interfaces has been developed, namely the variable length format type interface used to be connected to the mainframe, and the fixed length format type interface used to be connected to the UNIX server and the PC server.

Also, there is a technique capable of accessing from an open system, data of a mainframe, which is stored in a disk array equipped with both a variable length format type interface and also a fixed length format type interface.

In this access technique, while the variable length/fixed length format conversion is carried out within the disk array, the data of the mainframe which has been stored into the fixed length format type disk apparatus is derived via another fixed length format type interface owned by the disk array to the server of the open system in the direct form of the data stored in the fixed length format type disk apparatus. While the variable length/fixed length format conversion is carried out on the server of the open system, the data of the main frame is derived.

On the other hand, since processors of mainframes are manufactured in CMOS structures, these processors are gradually made in low cost and compact. As apparent from "Multiprise 2000 server" marketed by IBM Corporation, the technique capable of containing the fixed length format disks into the chassis of the mainframe is disclosed. In this technique, the fixed length format disk is directly connected to the processor of the mainframe; the CCW chain produced by the operating system on the processor of another mainframe is interpreted; the fixed length format disk is accessed; the fixed length/variable length format conversion is carried out; and the input/output request is executed. It should be noted that this fixed length/variable length format conversion may be realized by employing a portion of the main memory as a disk cache memory. As a result, since the compact disks contained in the chassis of the mainframe can be utilized without changing the existing operating system (OS) and the existing application program, the mainframe can be made compact and inexpensive. A different technical point from the above-explained IBM Multiprise 2000 server is to interpret the CCW chain produced by the operating system on the processor of the mainframe. As a consequence, there is no need to change the existing operating system and also the existing application program.

SUMMARY OF THE INVENTION

As previously described, there are many possibilities that recent computer centers are arranged by such mixture systems of mainframes, UNIX servers, and PC servers. In such arrangements, the disk array equipped with the variable length format type interface and the fixed length format type interface is required in order to commonly store the data to which the mainframe, the UNIX server, and the PC server separately access. However, since the apparatus for constituting the variable length format type interface is different from the apparatus for constituting the fixed length format type interface, the computer center must manage two different sorts of interface constituting apparatuses, resulting in cumbersome operation.

An object of the present invention is to provide a computer system arrangement capable of commonly storing data into a disk array equipped with a fixed length format type interface, this data being accessed by a mainframe, a UNIX server, and a PC server, respectively.

Another object of the present invention is to provide a computer system arrangement capable of commonly storing data into a disk array equipped with a fixed length format type interface, this data being accessed by a plurality of mainframes in addition to a UNIX server and a PC server, respectively.

In the above-explained prior art technique disclosed in IBM Multiprise 2000 server, the fixed length format type disk apparatus contained in the chassis is connected to the processor of the mainframe by way of the fixed length format type interface, whereas the storage provided outside the chassis, namely the storage shared by the host of another mainframe does not own a fixed length format type interface. In other words, the technique disclosed in IBM Multiprise 2000 server has such a purpose of realizing that the mainframe apparatus can be made compact, inexpensive, and having high performance, which is completely different from the above-described objects of the present invention.

In accordance with the present invention, the mainframe is equipped with the fixed length format type interface, and also a storage provided outside the chassis of this mainframe is equipped with the fixed length format. In other words, a fixed length format type connecting appliance may be employed as the connecting appliance derived outside the chassis.

The processor to which an appliance for supporting the fixed length format interface interfaced with the storage provided outside the chassis is connected may have a function capable of executing a CCW chain produced by another processor in accordance with a fixed length/variable length format conversion function.

While utilizing the appliance for supporting the fixed length format type interface derived outside the chassis of the mainframe, the disk array is connected to the mainframe by way of the fixed length format type interface. Furthermore, the disk array may have a function capable of being connected to an open system such as a UNIX server and a PC server by way of the fixed length format type interface.

With employment of the above-described arrangement, it is possible to provide a computer system arrangement capable of commonly storing data into a disk array equipped with a fixed length format type interface, this data being accessed by a mainframe, a UNIX server, and a PC server, respectively.

In the case that a plurality of mainframes are connected to the disk array by way of the fixed length format type interface, each of these mainframes employs the disk cache to execute the fixed length/variable length format conversion function. In this case, when a write request is issued from a certain mainframe, data stored in the data cache of this mainframe is not made coincident with data stored in a data cache of another mainframe. As a consequence, in accordance with the present invention, a control mechanism capable of making the data saved in the disk caches of the respective mainframes coincident with each other is provided in each of these mainframes. As a consequence, it is also possible to provide a computer system arrangement capable of commonly storing data into a disk array equipped with a fixed length format type interface, this data being accessed by a UNIX server and a PC server in addition to a plurality of mainframes, respectively.

In the case that a plurality of mainframes are connected to the disk array by way of the fixed length format type interface, it is further required to realize a sharing function of the disk apparatus in the plural mainframes. In other words, in the disk apparatus which is commonly shared by a plurality of mainframes, a mainframe issues a CCW for performing a lock allocation/release operation. Conventionally, in the disk apparatus connected to the main frame by way of the variable length format type interface, these CCWs are executed. In accordance with the present invention, an emulation function of CCW for performing this lock allocation/release operation is provided with a mainframe. As a consequence, the sharing function for the disk apparatus can be realized in a plurality of mainframes.

BRIEF DESCRIPTION OF THE DRAWINGS

A more better understanding of the present invention is made to read a detailed description in conjunction with the accompanying drawings, in which:

FIGS. 2A and 2B are illustratively a format of a control memory;

FIG. 3 illustratively represents a format of a track;

FIG. 6 is an explanatory diagram for explaining a conceptional idea of a computer system according to a second embodiment of the present invention;

FIG. 7 is an explanatory diagram for explaining a batch notification function of a sector number of a logical disk where an updating operation by a multi-cast function occurs, and a content of the updating operation to all of other mainframe hosts 100;

DETAILED DESCRIPTION OF THE EMBODIMENTS

Figure 1:
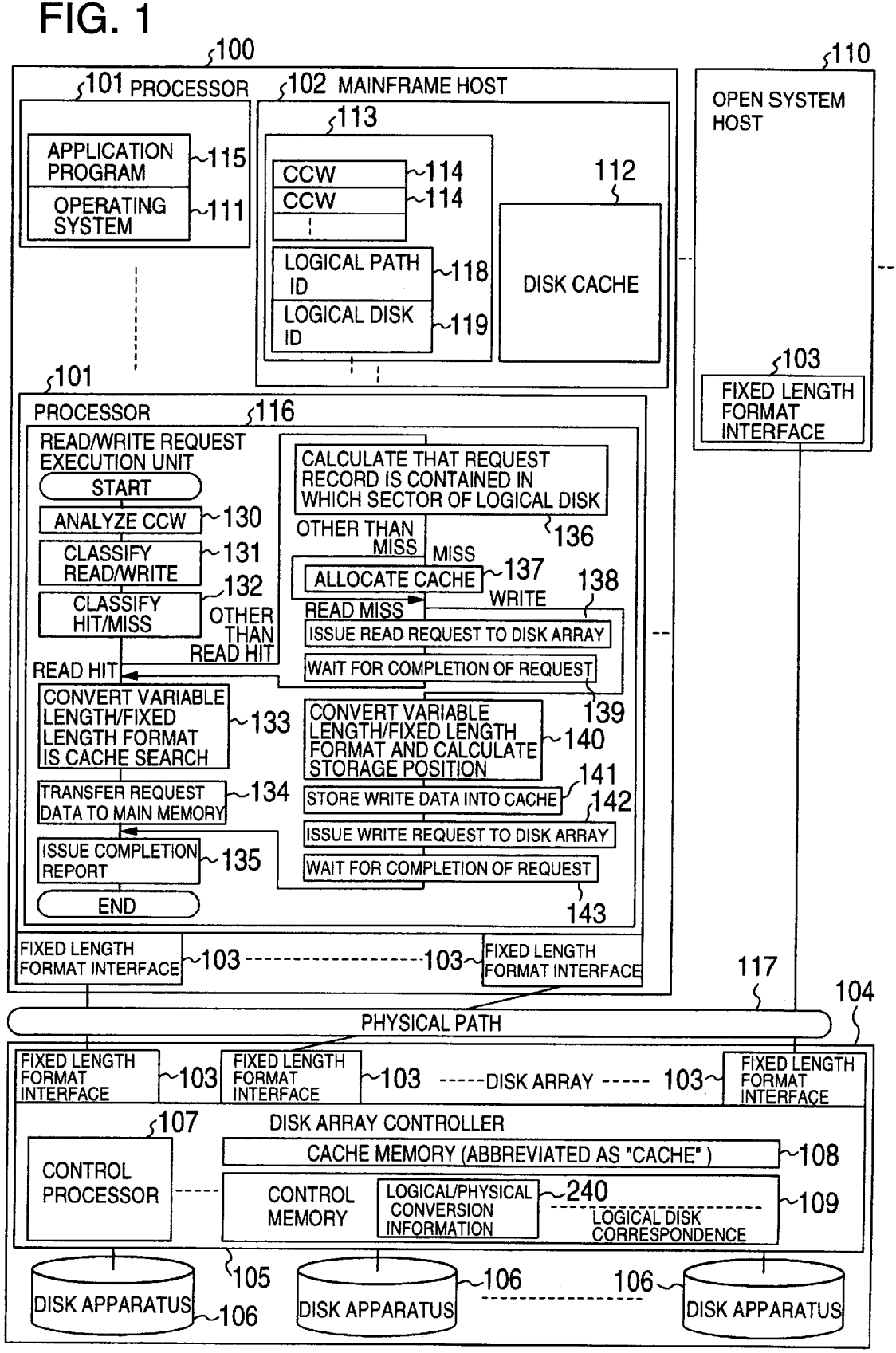
FIG. 1 is an explanatory diagram for explaining a conceptional idea of a computer system according to a first embodiment of the present invention.

Now, various embodiments of the present invention will be explained. A description is first made of a first embodiment. FIG. 1 schematically indicates a conceptional idea of a computer system according to the first embodiment. In the first embodiment, a computer system is arranged by at least one set of mainframe host 100, more than one set of open system host 110, and more than one set of disk array 104.

The open system host 110 is either a UNIX server or a PC server, and contains a fixed length format interface 103, for example, there is the SCSI (Small Computer System Interface). Recently, while an optical cable is employed as a base, the SCSI protocol is installed in a Fibre Channel to constitute another interface which is gradually utilized. Normally, the open system host 110 is connected to the disk array 104 by using the fixed length format interface 103.

The mainframe host 100 contains more than two sets of processors 101, a main memory 102, and more than one set of fixed length format interface 103.

As the connection interface between the mainframe host 100 and the storage provided outside the chassis of this mainframe host 100, namely the disk array 104, the fixed length format interface 103 is employed which may constitute a feature of the present invention.

The processor 101 may be classified into a processor connected to the fixed length format interface 103, and a processor which is not connected to the fixed length format interface 103. These processors are provided by at least one set of processors. In the processor 101 which is not connected to the fixed length format interface 103, an operating system 110 and an application program 115, which are used for the mainframe host 100, are operated. When the application program 115 issues a read/write request to the operating system 110, this operating system 110 forms a CCW chain 113 constructed of a CCW (Channel Command Word) 114 on the main memory 102 in accordance with the content of this read/write request. The read/write request of the mainframe host 100 is described in accordance with the interface of the variable length format.

The processor which is connected to the fixed length format interface 103 contains a read/write request execution unit 116 equal to such a function capable of executing a read/write request between this processor 103 and the disk array 104 in accordance with the content of the CCW chain 113. This processor 103 is connected to the disk array 104 via the fixed length format interface 103, whereas a read/write request of the mainframe host 100 is described in accordance with the variable length format interface. As a consequence, the read/write request execution unit 116 owns a variable length/fixed length format conversion function. It should be understood that when the variable length/fixed length format conversion function is executed, a portion of the main memory 102 is used as a disk cache 112. The data stored in the disk array 104 is partially contained in the disk cache 112.

The disk array 104 is arranged by a disk array controller (will be simply abbreviated as a "control unit" hereinafter) 105, and a disk apparatus 106.

The control unit 105 contains the fixed length format interface 103 so as to be connected to the mainframe host 100 and the open system host 110. Also, this control unit 105 contains more than one set of control processor 107, a cache memory 108, and a control memory 109.

A physical path 117 is a communication path for connecting the disk array 104 to the mainframe host 100 and the open system host 110. One set of mainframe host 100 is connected to the disk array 104 by way of more than one piece of physical path 117. Similarly, one set of open system host 110 is connected to the disk array 104 by way of more than one piece of physical path 117.

The control processor 107 receives read/write requests from the mainframe host 100 and the open system host 110 to execute an instructed operation. The data of the disk apparatus 105 is partially stored into the cache memory 108. The control memory 109 stores information required to execute the read/write request, and also the management information of the cache memory 108. Both the cache memory 108 and the control memory 109 are constituted by a semiconductor memory, and can be accessed in a higher speed than the access speed of the disk apparatus 106 by approximately one order. As a result, when such a write after function as disclosed in JP-A-4-245352 is additionally provided with the disk array 104, this disk array 104 can accomplish the write request by merely writing the data into the cache memory 108. Accordingly, the high performance of the disk array 104 can be greatly achieved.

In accordance with the present invention, as shown in FIG. 2A, in the case that the mainframe host 100 and the open system host 110 issue the read/write request, a designated disk will be referred to as a logical disk 200. The logical disk 200 does not necessarily correspond to the disk apparatus 105, namely the physical apparatus in an one-to-one relationship. Alternatively, redundant data may be contained in the logical disk 200 so as to be arranged in the RAID (Redundant Arrays of Inexpensive Disks) structure. To this end, the control memory 109 provided with the disk array 104 contains logical/physical conversion information 240. The logical/physical conversion information 240 is information corresponding to the logical disk 200, and is such information for indicating that this relevant logical disk 200 corresponds to which region of the disk apparatus 105.

FIG. 2B represents the issuing format of the variable length format type read/write request in the mainframe host 100 more in detail. In accordance with present invention, the format conversion between the variable length format and the fixed length format is carried out on the processor 101 of the mainframe host 100. Even in the read/write request issuing format of the variable length format, the read/write request is issued via a logical control unit 241 corresponding to the control unit 105. In accordance with the present invention, the control unit 105 need not correspond to the logical control unit 241 in an one-to-one correspondence. More than one piece of logical path 242 is provided between one set of mainframe host 100 and the logical control apparatus 241. In accordance with the present invention, the physical path 117 need not correspond to the physical path 242 in an one-to-one correspondence. As a consequence, the CCW chain 113 stored in the main memory 101 contains a logical path ID 118 and a logical disk ID 119. The logical path ID 118 indicates that the read/write request is issued by using which logical path 242. The logical disk ID 119 indicates that the read/write request is issued to which logical disk 200. Based upon this information, the read/write request execution unit 116 determines as to whether or not the read/write request is issued by using which physical path 117.

FIG. 3 indicates a format of a track of a variable length format type disk employed in the mainframe host 100. It should also be noted that in response to a read/write request, a track to be accessed is designated by a combination between a cylinder number and a read/write head number.

At a head of a track, control information called as an HA (Home Address) 300 is defined. Such information as a track number 311 is contained in the control information. Subsequent to the HA 300, a management record called as an R(Record)0-301 is defined. The data which is accessed by a general-purpose application program is stored into a record which is located after a record R1-302. A specific recording pattern having a fixed length, called as a gap 310, is written into a space between one record and another record. Since a track owns a fixed length whereas a record owns a variable length, a total number of records contained in the track is variable.

Figure 4:
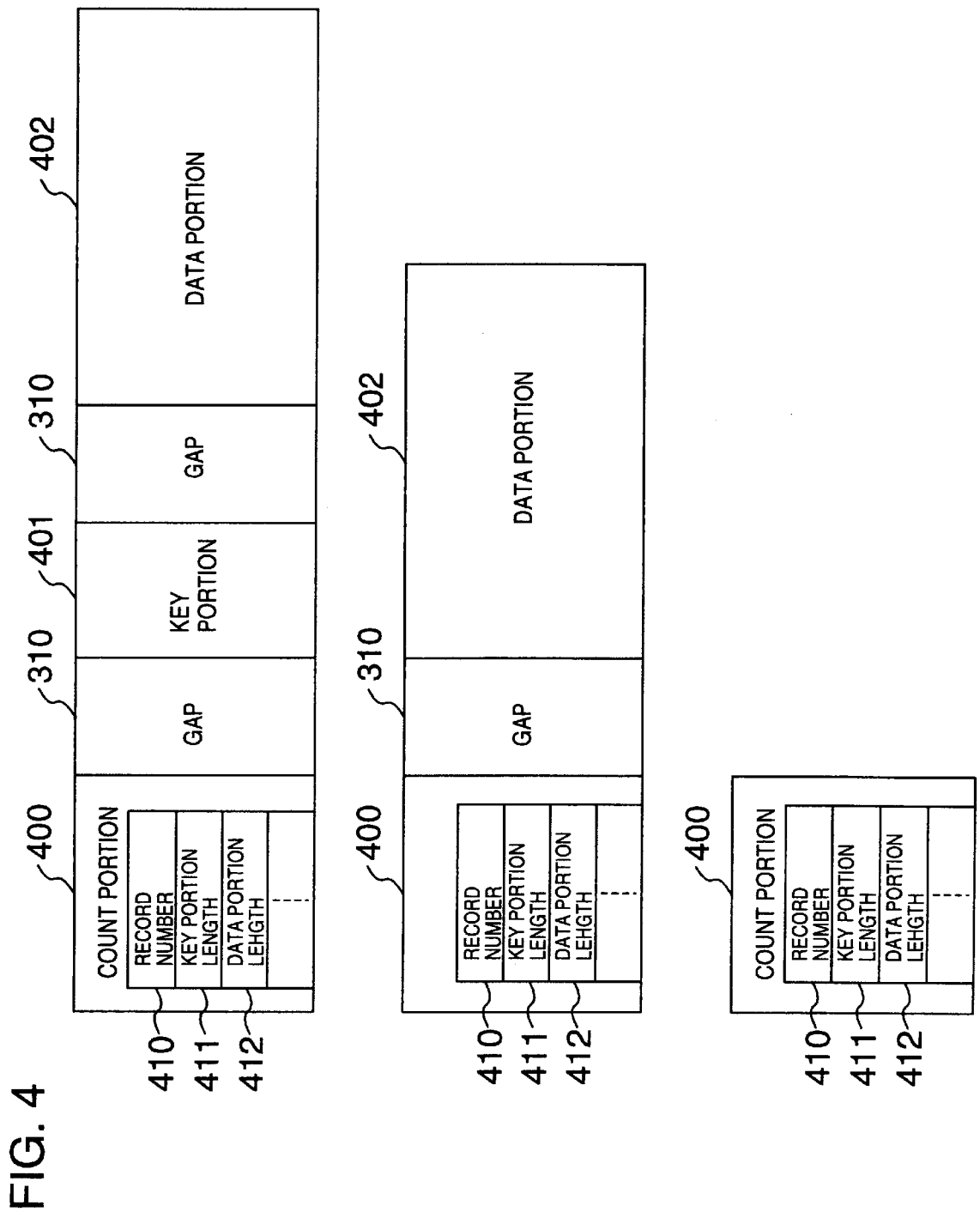
FIG. 4 illustratively indicates a format of a record.

FIG. 4 shows a format of each record. As indicated in FIG. 5, a record is constituted by a count portion 400, a key portion 401, and a data portion 402, alternatively arranged by the count portion 400 and a data portion, otherwise arranged by only the count portion 400. The count portion 400 has a fixed length, and contains various information such as a track number 311, a record number 410, a key portion length 411 indicative of the length of the key portion 401, and a data portion length 412 indicative of the length of the data portion 402. When a record does not contain the key portion 401 and the data portion 402, the key portion length 411 and the data portion length 412 become "0", respectively. It should be understood that in response to a read/write request, a record which is accessed is designated by the record number 410.

Into the key portion 401, key information is stored which is used to check a right capable of accessing the data portion 402. Into the data portion 402, data accessed by an application program is stored. The gap 310 is recorded on spaces among the count portion 400, the key portion 401, and the data portion 402.

Figure 5A:
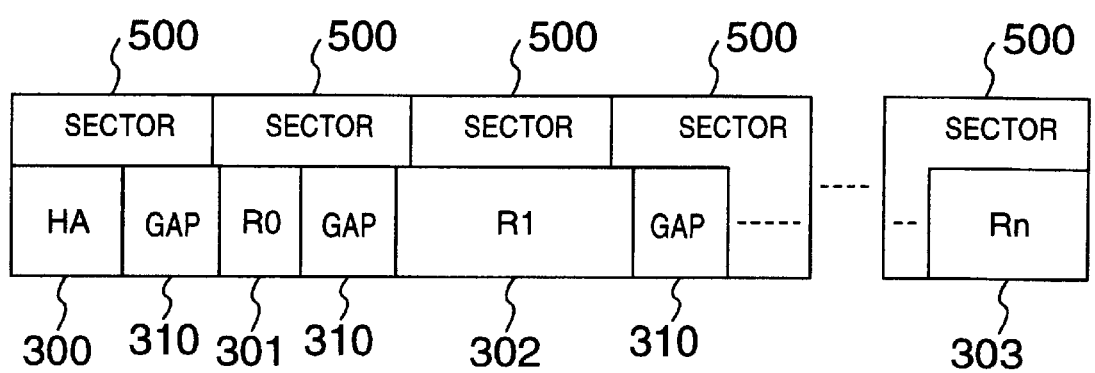
FIGS. 5A and 5B are explanatory diagrams for explaining a storage format used on a track fixed length format of a logical disk.
Figure 5B:
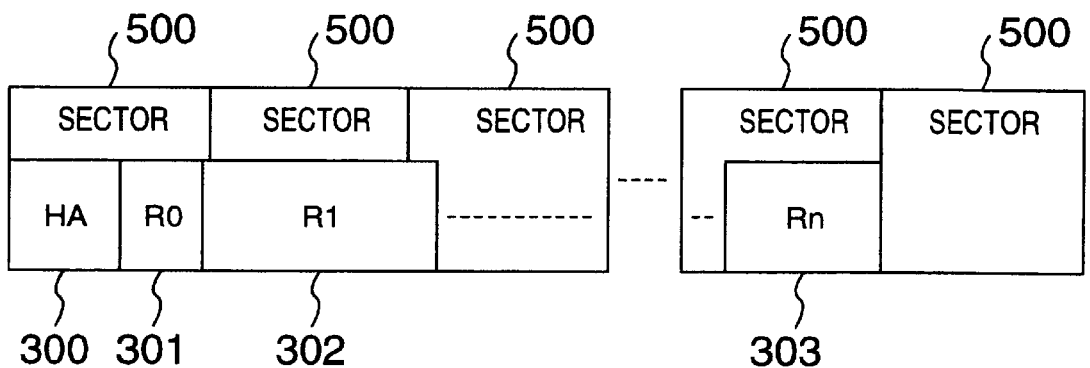
Figure 14:
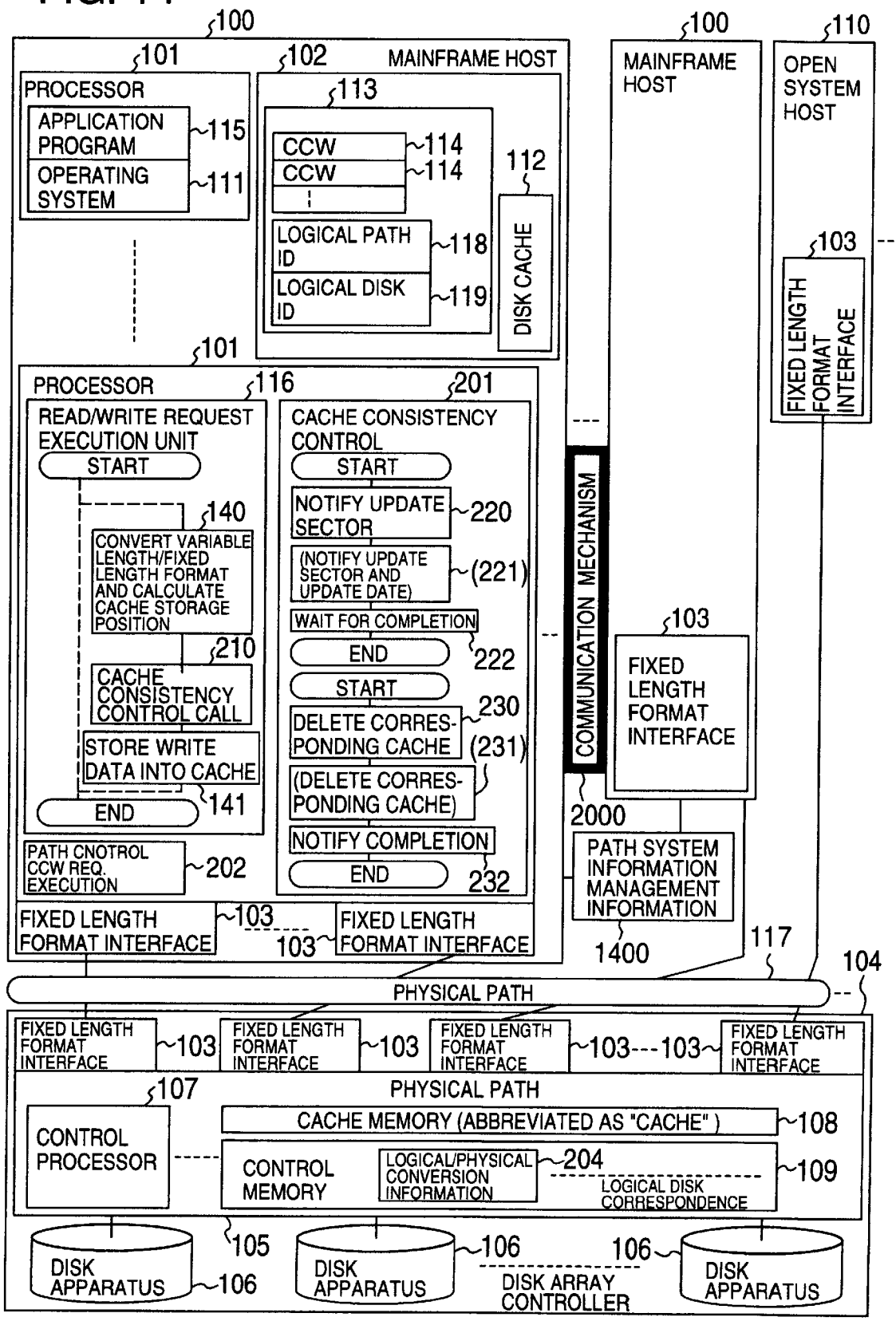
FIG. 14 illustratively shows a structural diagram in which a path system information management apparatus 1100 is arranged among mainframe hosts.

FIG. 5 illustratively shows an example of a storage format by which data is stored into the fixed length format type disk of the track shown in FIG. 14. A disk having a fixed length is constituted by a portion area having a fixed length called as a sector 500. The sector 500 is sequentially numbered by 1 from a sector 50 of a head of a disk in an increased order. In the fixed length format disk, the sector 500 accessed by a read/write request is defined by a sector number and a sector quantity. As previously explained, since a length of a track is fixed, the sectors 500, the total number of which is required to store the data having the track length, are allocated to 1 track. A method shown in FIG. 5A is such a method for storing into the sector 500, the information having the length to which the gap 310 is also determined. To the HA 300, the count portion 400, the key portion 401, and the data portion 402, areas having lengths equal to these portions are allocated. In a method indicated in FIG. 5B, the HA 300, the count portion 400, the key portion 401, and the data portion 402 are stored in a packed condition without storing the gap 310. In another method shown in FIG. 5B, a sector 500 located in a rear positions among the sectors allocated to the track may become an empty area.

The read/write request execution unit 116 analyzes the CCW chain 113 at a step S130 so as to recognize the logical record, the track, and the record, which are designated by the read/write request. At a step 131, the read/write request execution unit 116 classifies that the designated request corresponds to the read request, or the write request. At a step S132, the read/write request execution unit 116 judges as to whether or not a record is present in the disk cache 112 (hit), or not present in the disk cache 112 (miss). In the case of "read hit", at a step 132, the read/write request execution unit 116 searches the disk cache 112, executes the variable length/fixed length format conversion function, and recognizes that the requested variable length format record is located at any place within the disk cache 112. At a step 134, the read/write request execution unit 116 transfers the recognized record to the storage position of the main memory 102 designated by the request. At a step 135, the read/write request execution unit 116 reports a completion of a request.

In any cases other than "read hit", at a step 136, the read/write request execution unit 116 performs a calculation as to whether or not the requested record is contained in which sector of the fixed length format logical disk 200. Furthermore, in the case of "miss", at a step 137, a memory used to store the requested record into the disk cache 112 is allocated.

In the case of "read miss", the read/write request execution unit 116 requests the disk array 104 so as to read a sector containing a requested record at a step 138, and then, waits for a completion of this request at a step 139. Thereafter, the process operation jumps to the step 133 at which the read/write request execution unit 116 executes an operation similar to that of "read hit".

In the case of "write request", the read/write request execution unit 116 executes the variable length/fixed length format conversion function, and recognizes that the requested variable length format record should be stored into which storage position of the disk cache 112. At a step 141, the read/write request execution unit 116 transfers the write data from the storage position of the main memory 102 designated by the write request to the disk cache 112. At this time, such information as the gap 311, the count portion 400, and the key portion 401 is also set, if required. At a step 142, the read/write request execution unit 116 requests the disk array 104 to write the sector containing the written record, and then waits for a completion of the request at a step 143. Thereafter, the process operation jumps to the step 135 at which the completion of the request is reported. It should also be noted that as to the process operations defined at the steps 142 and 143, the method for executing the process operations after reporting the completion of the write request, namely the write after function method may be employed.

Next, a description will now be made of a second embodiment.

FIG. 6 illustratively shows a conceptional idea of a computer system according to the second embodiment. The second embodiment owns a different point such that more than two sets of mainframe hosts 100 are employed, as compared with the first embodiment. It is now assumed that these mainframe hosts 100 are connected to each other by employing a certain communication mechanism 2000. As an example of this communication mechanism 2000, there is a Fibre Channel.

In the case that more than two sets of mainframe hosts 100 are provided, when a write request is issued from a certain mainframe host 100 to update a record on the disk cache 112, if this record is stored in the disk cache 112 of another mainframe host 100, then data inconsistency occurs. As a result, in each of these mainframe hosts 110, the processor 103 connected to the fixed length format interface 103 contains a cache consistency control 201. Also, a content of a process operation by the read/write request execution unit 116 is slightly changed.

Furthermore, in the case that more than two sets of mainframe hosts 100 are employed, since the logical disk 200 is commonly used among the respective mainframe hosts 100, a lock allocation/release function must be realized. A path control CCW request execution unit 202 owns a function capable of executing these CCW 114.

The contents of the process operations executed in the second embodiment other than the above-explained operations are identical to those executed in the first embodiment.

The process content of the read/write request execution unit 116 of the second embodiment owns the following different points, as compared from that of the first embodiment. That is, when the write request is received, the cache consistency control 201 is called at a step 210 executed between the step 140 and the step 141. The contents of the process operations executed in the second embodiment other than this process operation are identical to those executed in the first embodiment.

The cache consistency control 201 commences the execution when the execution request is received from the read/write request execution unit 116, or when the request is received from another mainframe host 100. A first description will now be made of an operation of the cache consistency control 201 in the case that the execution request is received from the read/write request execution unit 116.

At a step 220, a sector of the logical disk 200 where an update occurs is notified to all of other mainframe hosts 100. If the cache consistency control 201 which receives this notification deletes this sector from the disk cache 112, then this cache consistency control 201 does not need to perform any other than this operation. Alternatively, at a step 221, both the number of the sector where the update occurs and the update content may be transferred to all of other mainframe hosts 100 so as to update the content of the sector of the disk cache 112. At a step 222, the cache consistency control 201 waits for a completion report. When the above-described process operation is accomplished, the cache consistency control 201 completes the operation. It should be noted that when the Fibre Channel is employed in the communication mechanism 2000, if a multi-cast function of the Fibre Channel is utilized, as indicated in FIG. 7, the operation of this cache consistency control 201 can be easily carried out. As indicated in FIG. 7, when the multi-cast function is utilized, the sector of the logical disk 200 where the update occurs may be notified to all of other mainframe hosts 100, and also the content of this update may be sent to all of other mainframe hosts 100 by issuing the request only one time.

Figure 8:
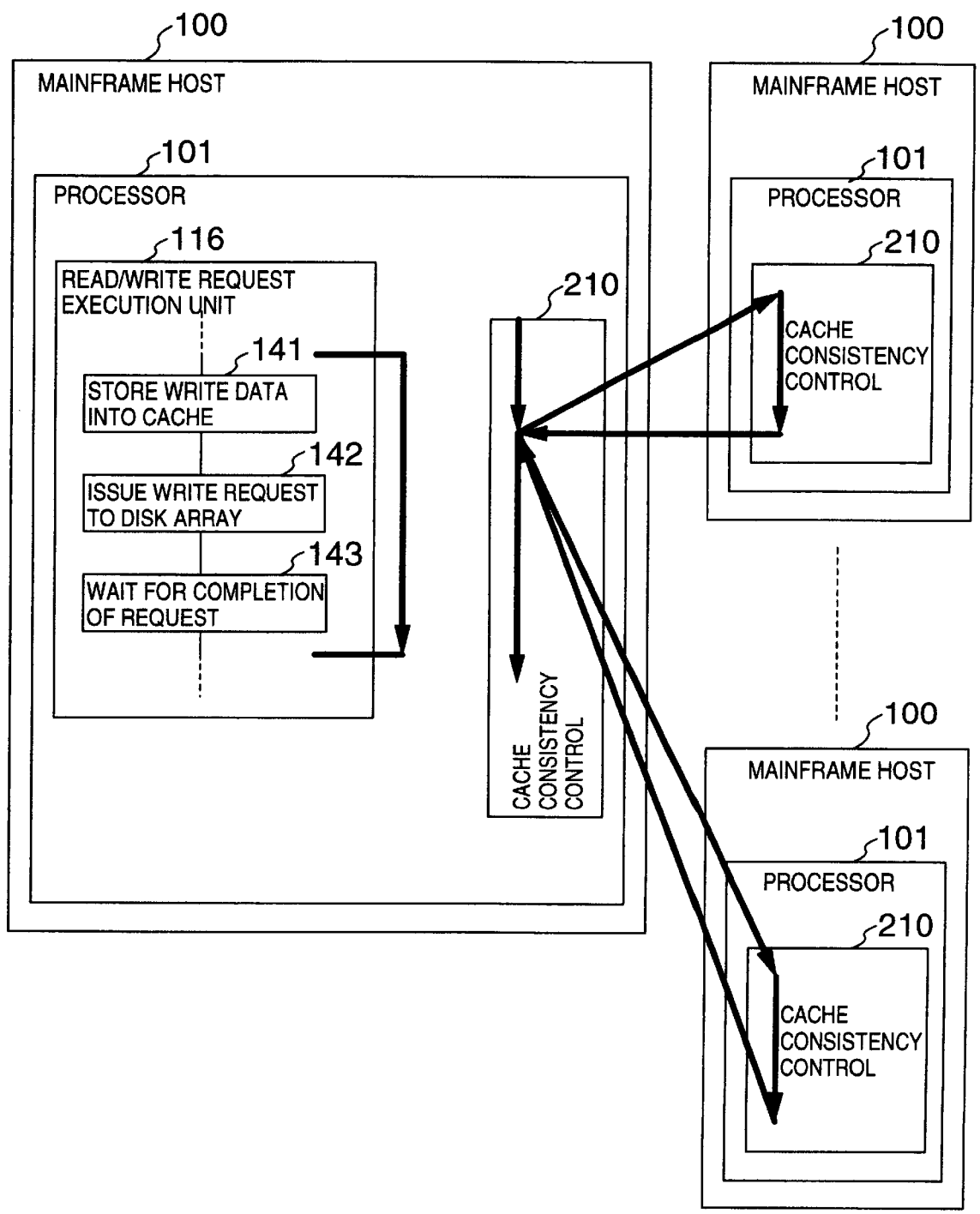
FIG. 8 illustratively shows a parallel execution operation diagram for both a process operation executed by a cache consistency control 201 and another process operation for writing write data at steps 140 to 143 into a disk cache memory 122 and further for writing the write data into a disk array 104.

It should also be noted that, as indicated in FIG. 8, the process operation executed by the cache consistency control 201 may be carried out in parallel to such a process operation that the write data at the steps 141 to 143 is written into the disk cache 122 and furthermore, is written into the disk array 104.

Next, a description will now be made of operations in such a case that the cache consistency control 201 receives the request issued from another mainframe host 100. When the cache consistency control 201 deletes the sector where an update occurs from the disk cache 112, this cache consistency control 201 receives the information about the sector number where the update occurs, and deletes the sector where the update occurs from the disk cache 112. When the updated content is stored into the disk cache 112, at a step 231 instead of the step 230, the cache consistency control 201 receives both the sector number where the update occurs and the updated content, and updates the sector where the update occurs on the disk cache 112 so as to notify the completion of the process operation.

In the first embodiment, when the write request is received, the read/write request execution unit 116 may perform the data writing operation to the disk array 104 even by executing the "write through method", or the "write after function". However, in the second embodiment, when the method for deleting the disk cache 112 of another mainframe host 100, the read/write request execution unit 116 must perform the data writing operation to the disk array 104 by executing the "write through method". In this case, when the write after function as explained in JP-A-4-245352 is added to the disk array 104, since the write request can be completed by merely writing the data into the cache memory 108, even if the mainframe host 100 employs the write through method, there is a small problem as to the performance.

Figure 9:
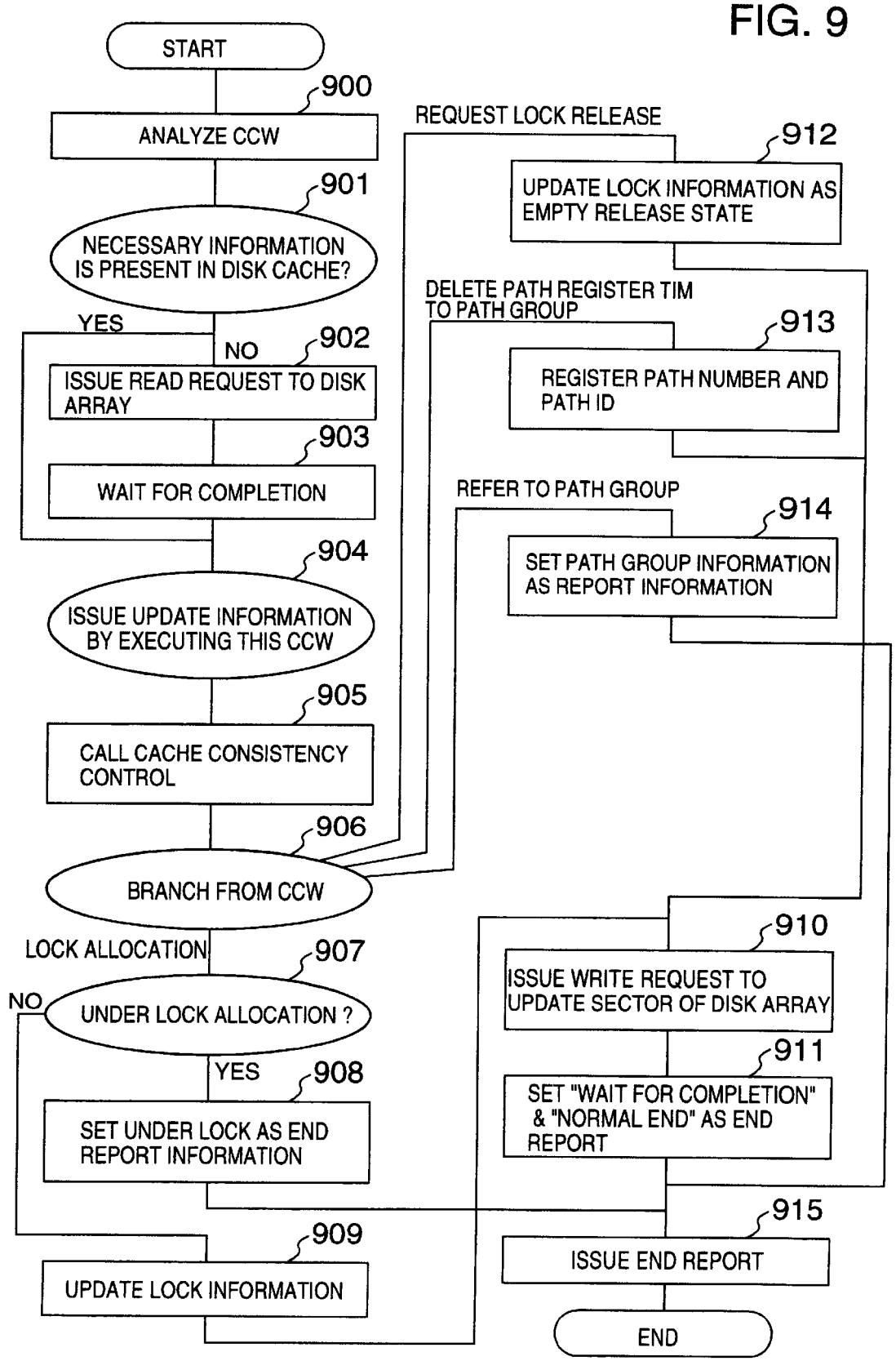
FIG. 9 is a flow chart for describing a process operation of a path control CCW execution unit 202.
Figure 10:
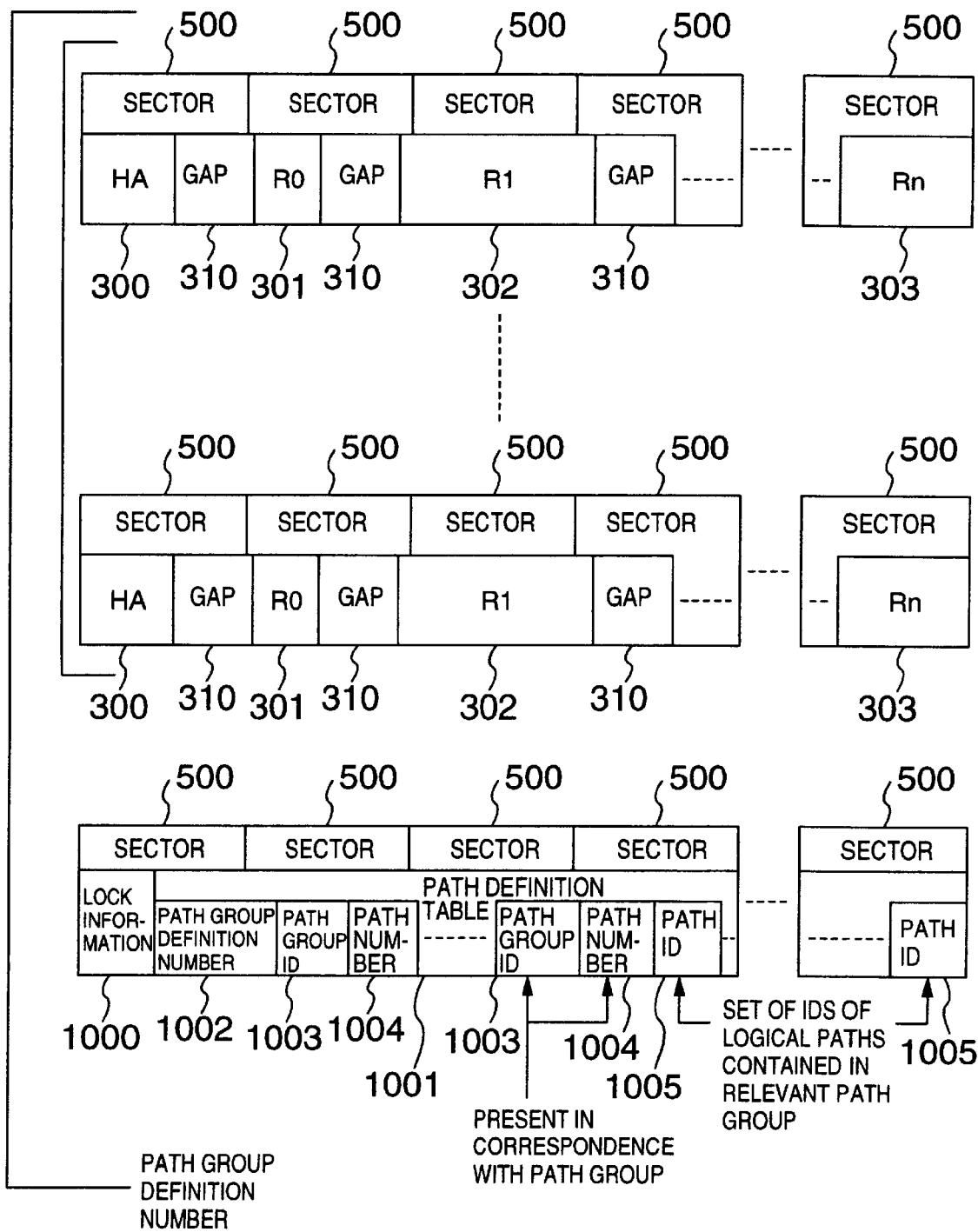
FIG. 10 illustratively indicates a structural diagram of data handled by the path control CCW execution unit 202.

FIG. 9 is a flow chart for explaining a process operation of the path control CCW execution unit 202. FIG. 10 illustratively shows a structure of data handled by the path control CCW execution unit 202.

Figure 11A:
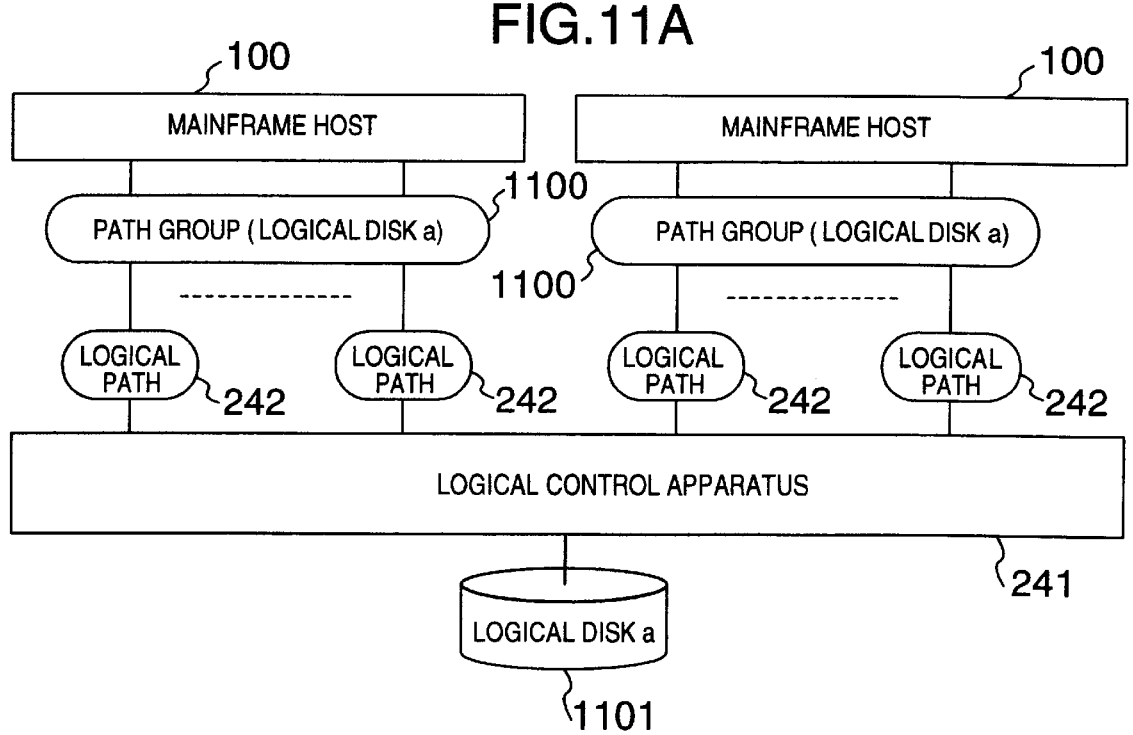
FIGS. 11A and 11B indicate structural diagrams for defining a path group.
Figure 11B:
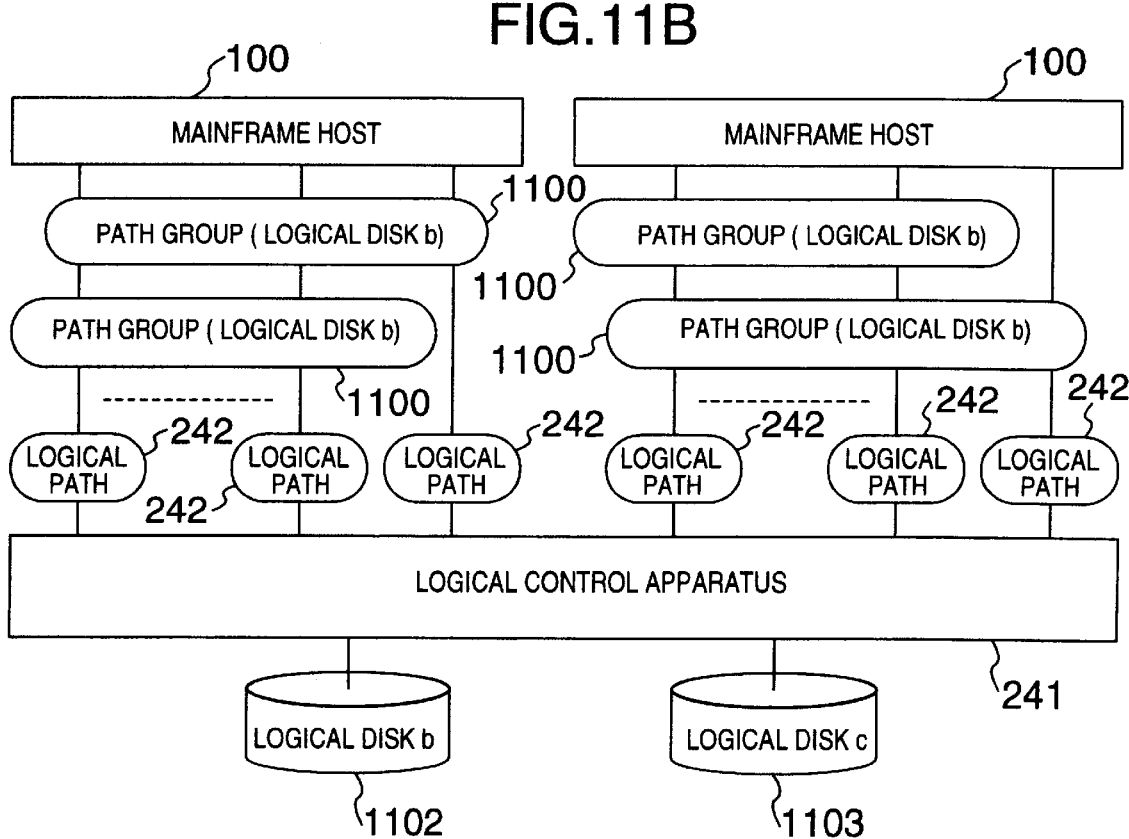

As shown in FIG. 2B, more than one piece of logical path 242 is provided between one set of mainframe host 100 and the logical control unit 241. As viewed from the logical control unit 241, since the read/write request is received via the logical path 242, in such a case that a certain mainframe host 100 causes a certain logical disk 200 to be locked, it is required to identify as to whether or not this logical path 242 corresponds to such a logical path 242 provided between this certain mainframe host 100 and the mainframe host 100 for locking the logical disk 200. As a consequence, as represented in FIG. 11A, when the lock allocation/release of the logical disk is carried out, such an idea known as a path group 1100 is employed in order to identify the lock allocation/release request issued from which mainframe host 100. The path group 1100 is set with respect to each of the logical disks 200. Basically, the path group 1100 is a set of logical paths 242 provided between the same mainframe host 100 and the logical control unit 231. In FIG. 11A, there is shown a logical disk "a" 1101 as an example. It should be noted that as indicated in FIG. 11B, all of such logical paths 242 provided between the same mainframe host 100 and the logical control unit 241 need not be contained in one set of path group 1100. Also, when the logical disks 200 differ from each other, the set of logical paths 242 contained in each of the path groups 1100 may be changed.

As a consequence, CCW 114 for executing the request for assembling the respective logical paths 242 into the path group 1100 and also the request for releasing the respective logical paths 242 from the path group 110 is produced by the processor 102 which is not connected to the fixed length format interface 103. Apparently, CCW 111 with employment of an identifier of the path group 1100 is also produced which requires the lock allocation/release function of the logical disk 200 by the processor 101 which is not connected to the fixed length format interface 103. The path control CCW execution unit 202 owns a function capable of executing these CCWs 114.

Before describing the process operation of the path control CCW executing unit 202, the storage formats of the definition information about the path group 1100 and of information for indicating as to whether or not the lock request is issued in this embodiment will now be explained. As indicated in FIG. 10, in this embodiment, the storage format is defined as partial information of the logical disk 200. A sector for storing thereinto the above-explained information is provided after a set of sectors for storing tracks within the logical disk 200. The lock information 1000 indicates such a condition that locking of which main frame host 100 is allocated, or such a condition that which mainframe host 100 is not locked. A path group definition table 1001 contains a path group definition number 1002, a bus group ID 1003, a path number 1004, and a path ID 1005. The lock information 1000 and the path group definition table 1001 are present in correspondence to the logical disk 200. The path group definition number 1002 indicates the number of path group 1100 defined in the corresponding logical disk 200. In other words, the path group definition number 1002 indicates how many the mainframe host 100 can access this relevant logical disk 200. As a consequence, the path group definition number 1000 corresponds to one piece of information contained in the path group definition table 1001.

Both the path group ID 1003 and the path number 1004 constitute information existed in correspondence to the path group 1100 defined in correspondence with each of the logical disks 200. The path group ID 1003 is an identifier of each of the path groups 1100 defined in correspondence with each of the logical disks 200. The path number 1004 is the number of paths contained in the corresponding path group.

The path ID 1005 is such information existed in correspondence with the logical path 232 contained in each of the path groups 1100, and indicates an identifier of the logical path 242.

Since the above-described definition information is defined as the partial information of the logical disk 200, this definition information may be stored into the disk cache 112 of the mainframe host 102.

As a result, when the above-described definition information is updated, the path control CCW execution unit 202 issues a request to the disk array 104 to write the corresponding sector 500 on the logical disk. Furthermore, the path control CCW execution unit 202 calls the cache consistency control 201 to perform the consistency control between the path control CCW execution unit 202 and the disk cache 112 of another mainframe host 100.

Figure 12:
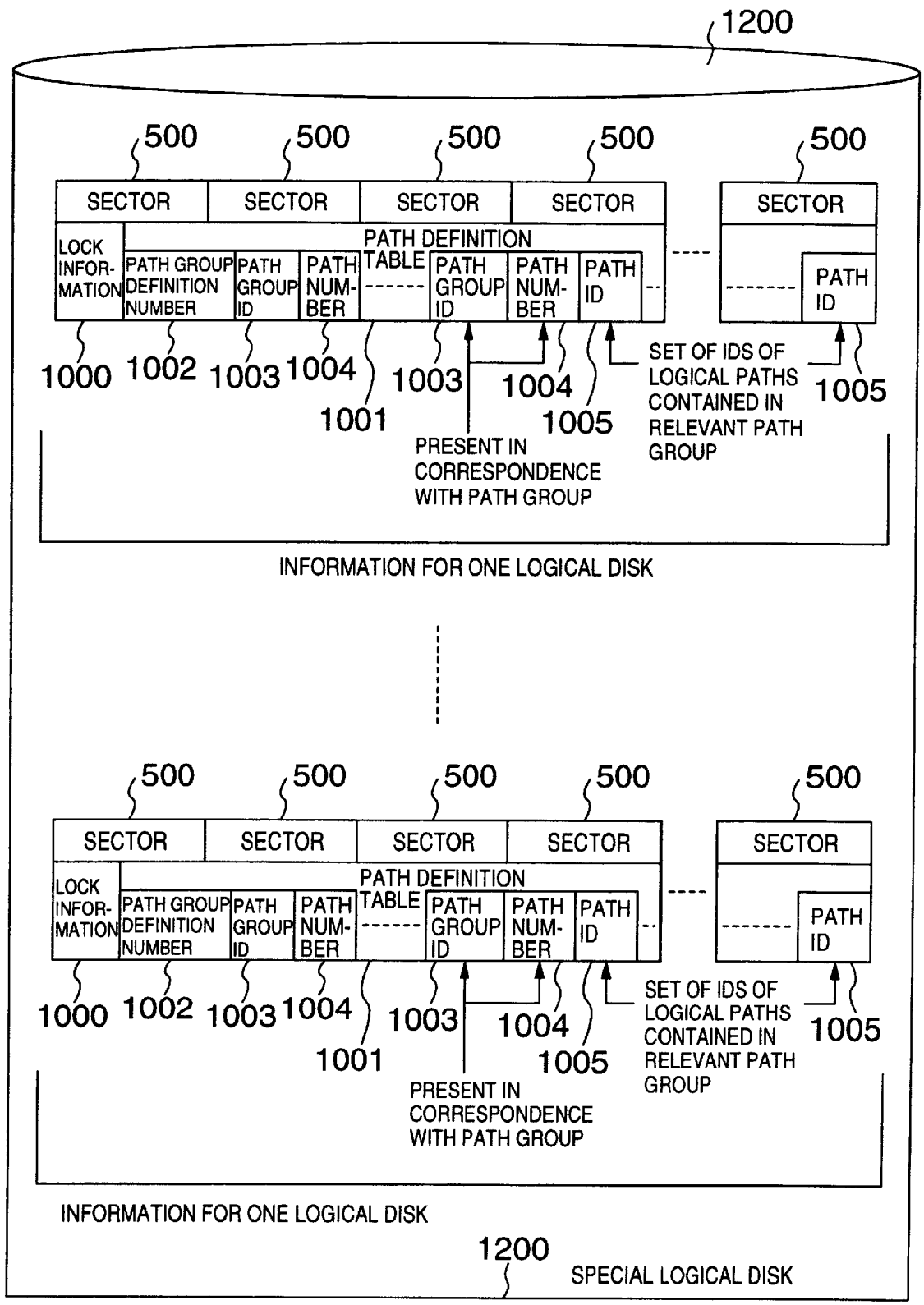
FIG. 12 schematically shows a storage structural diagram in such a case that lock information 1000 corresponding to the respective logical disks 200, and a path group definition table 1001 are stored.

In FIG. 10, the lock information 1000 and the path group definition table 1001 are stored into a partial area within the logical disk 200. Alternatively, as indicated in FIG. 12, while the lock information 1000 and the path group definition table 1001 in correspondence with the respective logical disks 200 are grouped, the grouped information/table may be defined in the area defined in the disk array 104. In this alternative case, the area for storing the above-described information may be set to a specific from the logical disk 200 for storing the data read/written by the mainframe host 100.

Figure 13:
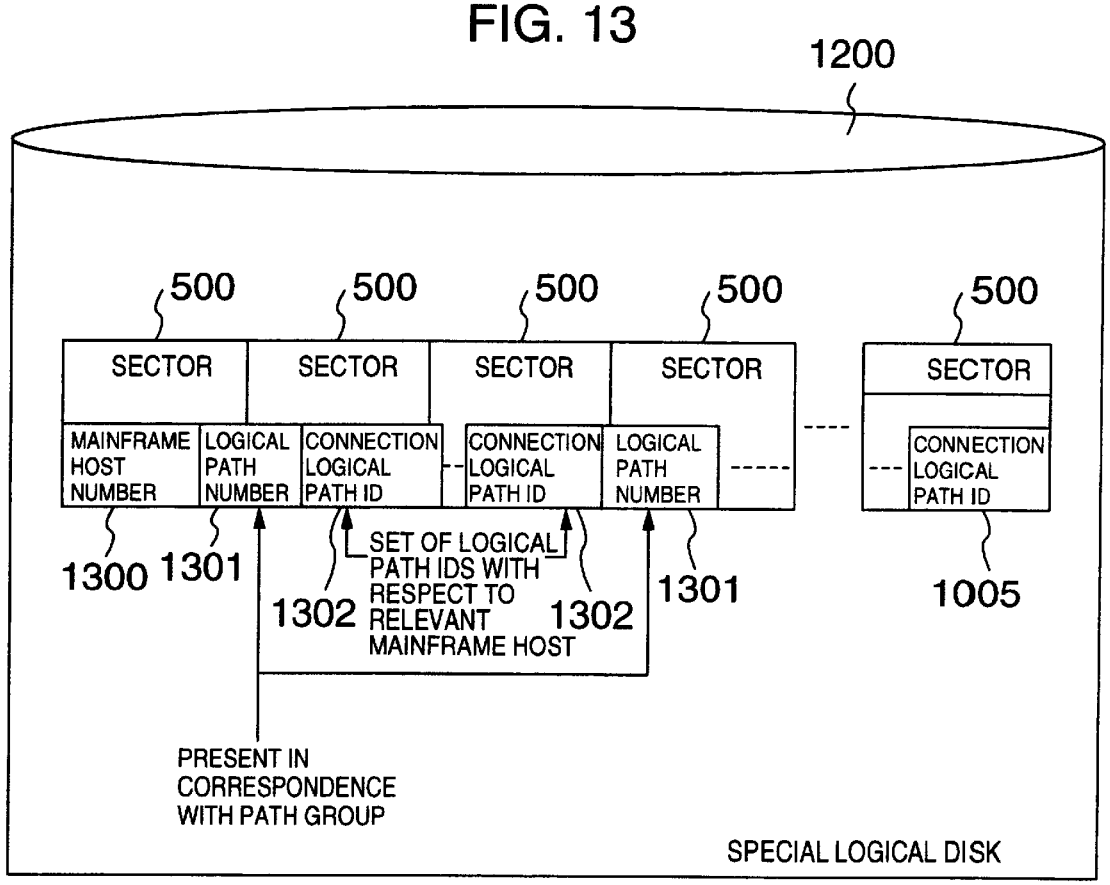
FIG. 13 illustratively represents definition information of a logical path.

FIG. 13 represents definition information of the logical path 238 defined in the respective mainframe hosts 100. It should be understood that the area used to store this definition information may be set to the specific logical disk 1200 different from the logical disk 200 used to store the data read/written by the mainframe host 100. A mainframe host number 1300 is equal to a quantity of the mainframe host 100 to which this disk array 104 is connected. A logical path number 1301 is information existed in correspondence with the mainframe host 100, and is equal to a quantity of the logical paths 232 defined between the relevant mainframe hosts 100. A connection logical path ID 1302 is an identifier of a logical path 232 defined between the relevant mainframe hosts 100. A total number of connection logical path ID 1302 is equal to that of the logical path numbers 1301.

Now, a description will be made of a process flow operation. At a step 900 of FIG. 9, the path control CCW execution unit 202 analyzes the issued CCW 114. At a step 901, the path control CCW execution unit 202 confirms whether or not information required to execute this CCW 114 is stored in the disk cache 112. When this necessary information is stored in the disk cache 112, the process operation jumps to a further step 905. To the contrary, when this necessary information is not stored, in the disk cache 112, the path control CCW execution unit 202 issues a read request to the disk array 104 in order that the sector 500 into which the required information has been stored is stored into the disk cache 112 at a step 902. At a step 903, the path control CCW execution unit 202 waits for a completion.

At a step 904, the path control CCW execution unit 202 judges as to whether or not the information such as the lock information 1000 and the path group definition table 1001 is updated by executing this CCW 114. When the information is updated, the path control CCW execution unit 202 calls the cache consistency control 201 and executes easing of the sector 500 for storing thereinto update information which is probably stored in the disk cache 112 of another mainframe host 100.

At steps subsequent to a step 906, the path control CCW execution unit 202 is brought into the executing operation of the CCW 114. At the step 906, the process operation is branched in accordance with the CCW 114. When the lock allocation request is issued, the path control CCW execution unit 202 refers to the look information 1000 in order to see as to whether or not the mainframe host 100 is locked by another mainframe host 100. When the mainframe host 100 is locked by another mainframe host 100, the path control CCW execution unit 202 saves as end information such a fact that the mainframe host 100 is locked by another mainframe host 100, at a step 808, and then the process operation jumps to a further step 915. To the contrary, when the mainframe host 100 is not locked by another mainframe host 100, the path control CCW execution unit 202 updates the lock information 1000 to be brought into such a state that this mainframe host 100 is locked. This may set the information corresponding to the path group 1100, which is contained in the CCW 114, into the look information. At a step 910, the path control CCW execution unit 202 requests the sector 500 containing the updated information to be written into the disk array 104 at a step 910. At a step 911, the path control CCW execution unit 202 receives a completion report, and saves as an end report such a fact that the CCW 114 is accomplished under normal condition, and then the process operation jumps to the previous step 915.

When the lock release request is issued, the path control CCW execution unit 202 updates the lock information 1000 to such a state that this mainframe host 100 is not locked. At this time, the path control CCW execution unit 202 compares the information equivalent to the path group 1100 contained in the CCW 113 with the information contained in the lock information 1000. Thereafter, the process operation jumps to the step 910 in order to update the sector 500 which contains the updated lock information 1000.

When a register/delete request of the logical path 232 to the path group 110 is issued, the path control CCW execution unit 202 updates the corresponding path group number 1002, the path group ID 1003, the path number 1004, and the path ID 1005 at a step 913. In the case that the logical path 232 of a completely new patch group is defined, and all of the logical paths 232 of a certain path group 1100 are deleted, the path control CCW execution unit 202 first updates the corresponding path group number 1001, and the group ID 1002. In such a case that other logical paths 232 are still left even by defining/deleting the logical path 232 into/from the previously-defined path group 1100 and also even by this path group 1100, the path control CCW execution unit 202 updates the path number 1003 and the path ID 1004. Thereafter, since the sector 500 containing the updated path number/path ID 102 is updated, the process operation jumps to the step 910.

When such a request for referring to a path group containing a designated path is issued, the path control CCW execution unit 202 sets the corresponding path group ID 1002 as notification information at a step 914, and then the process operation jumps to a step 915.

At this step 915, the path control CCW execution unit 202 issues an end report of the CCW 114.

In this embodiment, the lock information 1000 and the path group definition table 1001 are contained as the partial information of the logical disk 200. Alternatively, as shown in FIG. 14, an exclusively-used path system information management apparatus 1400 may be provided between the mainframe hosts 100, so as to manage the lock information 1000 and the path group definition table 1001. It should be understood that both the lock information 1000 and the path group definition table 1001 are preferably made in a non-volatile form also in this alternative arrangement.

Figure 15:
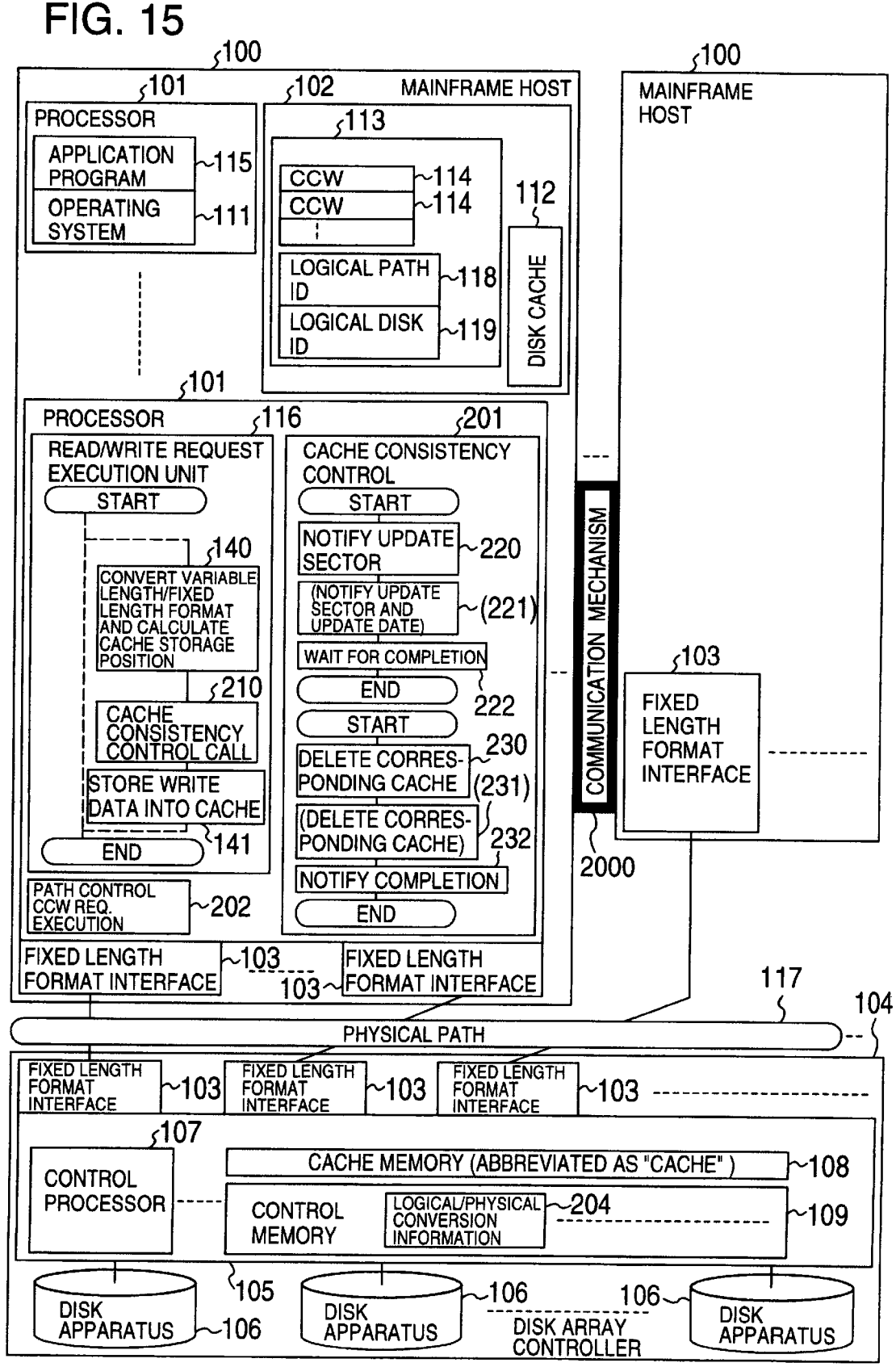
FIG. 15 illustratively indicates a structural diagram which does not contain an open system host 110.
Figure 16:
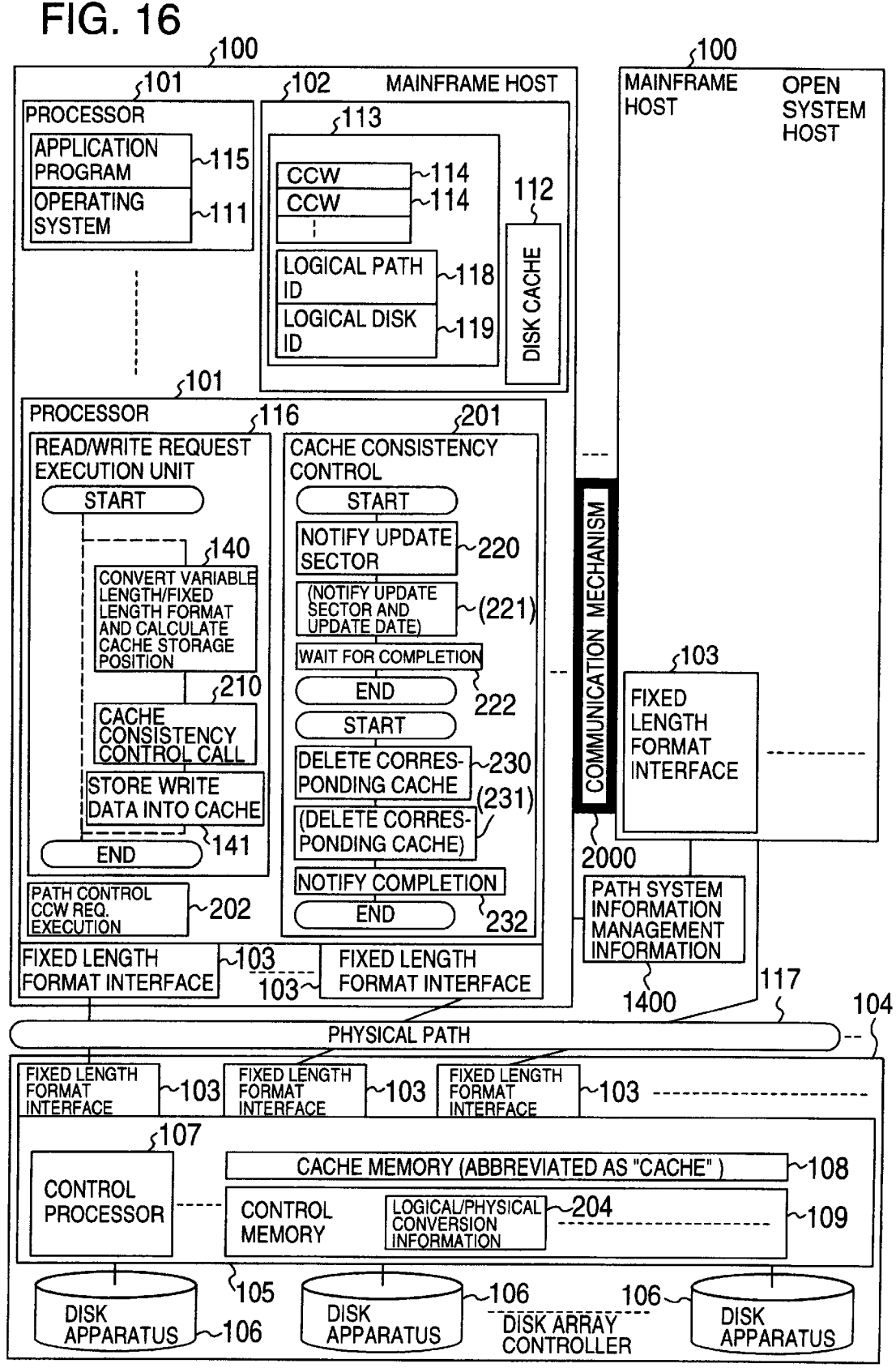
FIG. 16 illustratively shows a structural diagram in which the path system information management apparatus 1100 is arranged in such a case that a plurality of mainframe hosts 100 are present, and the open system host 110 is not contained.

Also, in such a case that a plurality of mainframe hosts 100 are provided like in the second embodiment, as represented in FIG. 15, the present invention may be effectively accomplished even in the arrangement which dose not contain the open system host 110. Similarly, as shown in FIG. 16, in such a case that a plurality of mainframe hosts 100 are present and the open system host 110 is not contained, the present invention can be effectively accomplished even in such an arrangement that the path system information management apparatus 1100 is provided.

The object of the present invention is to provide the arrangement of the computer system capable of commonly storing the data to which the mainframe and the open system separately access into the disk array equipped with the fixed length format interface. Conventionally, in order to commonly store the data to which the mainframe, the UNIX server, and the PC server separately access, such a disk array is required which is equipped with both the variable length format interface and the fixed length format interface. To the contrary, in accordance with the present invention, since only the fixed length interface is merely employed, the managing steps can be largely reduced.

What is claimed is:

1. A computer system constituted by at least one mainframe host; more than at least one open system host; and a disk system having a frame independent from those of said mainframe host and said open system host, and storing thereinto data which is accessed by said mainframe host and second open system host, wherein:

said disk system comprises means including a fixed length format interface for connecting said mainframe host and said open system host thereto;

said open system host comprises means including a fixed length format interface for connecting said disk system thereto by;

said mainframe host comprises a plurality of processors and a main memory;

at least one processor among said plurality of processors comprises means for storing into said main memory, a read/write request issued in accordance with a variable length format; and at least one processor among said plurality of processors comprises means for converting the read/write request issued in accordance with the variable length format into a fixed length format in accordance with a variable length format/fixed length format conversion function; and means for connecting said disk system therewith by the fixed length format interface.

2. A computer system constituted by at least two mainframe host; at least one open system host; and a disk system having a frame independent from those of said mainframe hosts and said open system host, and storing thereinto data which is accessed by said mainframe host and second open system host, wherein:

said disk system comprises means including a fixed length format interface for connecting said mainframe hosts and said open system host thereto;

said open system host comprises means including a fixed length format interface for connecting said disk system thereto;

each of said mainframe hosts comprised a plurality of processors and a main memory;

at least one processor among said plurality of processors comprises means for storing into said main memory, a read/write request issued in accordance with a variable length format;

at least one processor among said plurality of processors comprises:

means for converting the read/write request issued in accordance with the variable length format into a fixed length format in accordance with a variable length format/fixed length format conversion function; and further for executing the converted read/write request;

means for storing partial data of said disk system into said main memory;

means for notifying that which data is updated by a write request to another mainframe host when the write request issued in accordance with the variable length format is processed;

means for receiving from another mainframe host information as to which data is updated by the write request, and thereby erasing data to be updated from said main memory; and means for connecting said disk system thereto by the fixed length format interface.

* * * * *